United States Patent [19]
Halsey

[11] 3,861,808
[45] Jan. 21, 1975

[54] INSTRUMENT FOR MEASURING CURVED SURFACES

[76] Inventor: Edmund R. Halsey, 267 Westport Rd., Wilton, Conn. 06895

[22] Filed: Dec. 4, 1972

[21] Appl. No.: 311,852

[52] U.S. Cl................. 356/169, 250/237 G, 351/6, 356/124
[51] Int. Cl........................ G01b 11/04, G01b 9/00
[58] Field of Search........... 356/109, 169, 124, 127; 351/6, 13; 250/237 G

[56] References Cited
UNITED STATES PATENTS
| | | | |
|---|---|---|---|
| 3,166,624 | 1/1965 | Vargady | 356/169 |
| 3,544,220 | 12/1970 | Kaye | 356/109 |
| 3,640,610 | 2/1972 | Nupuf | 356/127 |

*Primary Examiner*—William L. Sikes
*Assistant Examiner*—Conrad Clark
*Attorney, Agent, or Firm*—St. Onge, Mayers, Steward & Reens

[57] ABSTRACT

An instrument for measuring curved surfaces, such as lenses, by moire fringe patterns and keratometry is disclosed having a target pattern arch backlighted from a single light source to reflect the target and mire pattern from the surface and superimpose them on two reticles adjacent the eyepiece to form moire fringe patterns and to measure the distances between the reflections on the mires. The two reticles are closely spaced with one fixed and one movable to vary the calibrated measuring pattern. The reticle pattern is masked so that only a portion of the moire fringe pattern is seen through the instrument so that one moire fringe line may be used to indicate sphericity and/or radius. The instrument is focused by movement of the curved surface holder toward and away from the objective lens of the instrument to balance the moire fringe pattern made with each reticle. The holder is positioned in a floating magnetic ring for centering the lens along the optical axis of the instrument.

21 Claims, 24 Drawing Figures

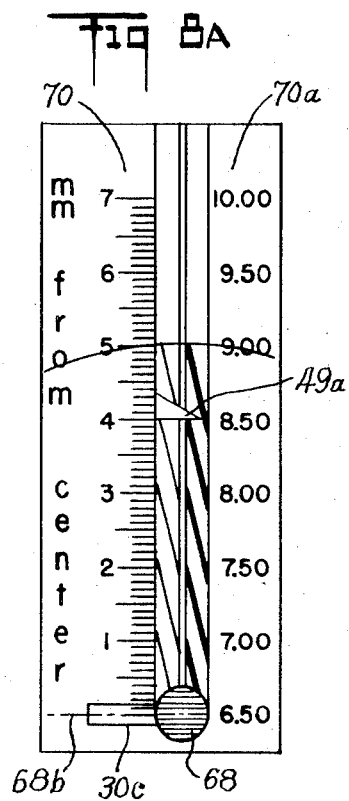
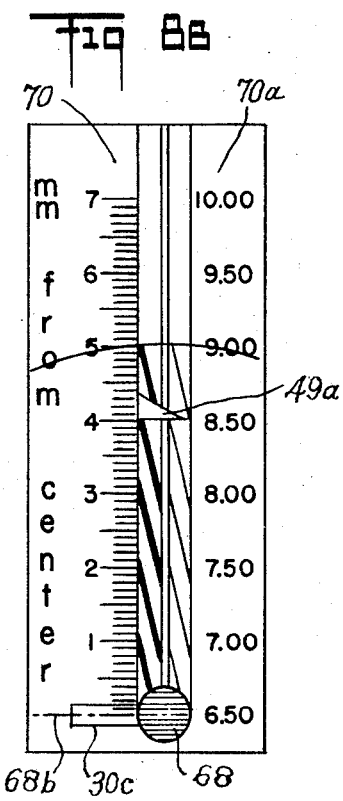
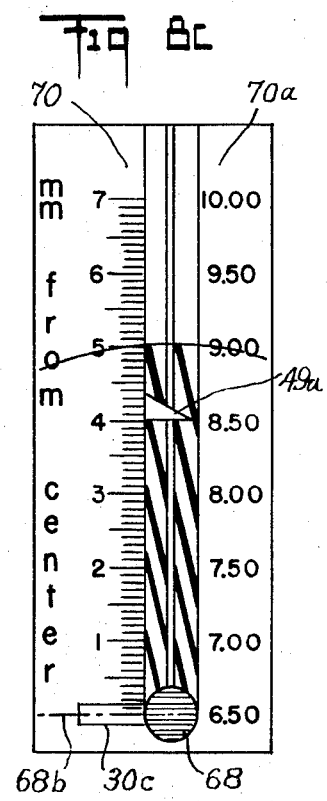
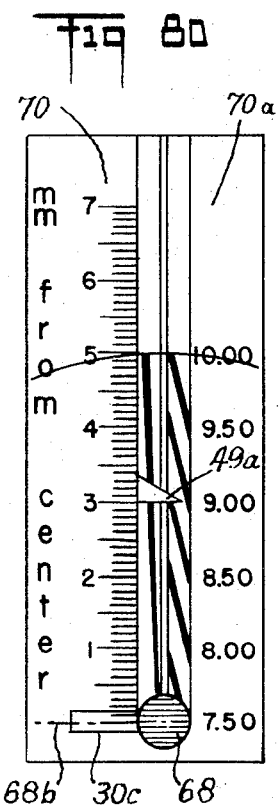
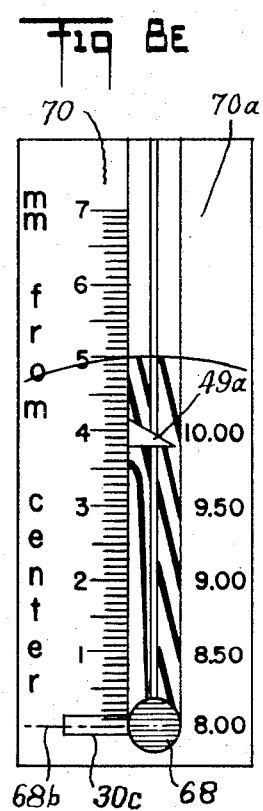
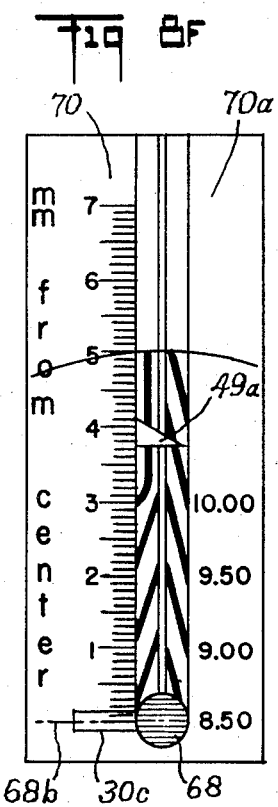
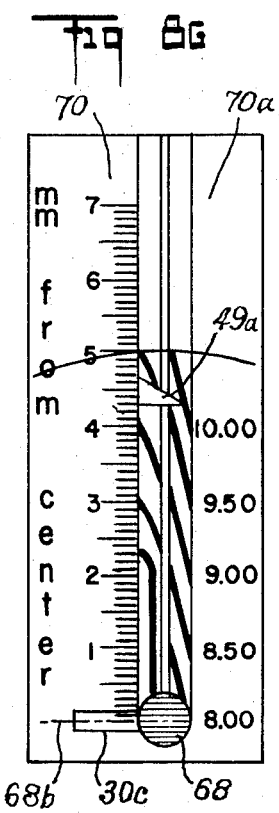

3,861,808

INSTRUMENT FOR MEASURING CURVED SURFACES

BACKGROUND OF THE INVENTION

This invention relates to optical instruments employing moire fringe patterns and keratometry for the measurement of curved surfaces such as lenses, the cornea and sclera of the eye and the like. More particularly the invention relates to such optical instruments wherein a reticular target pattern is reflected from the curved surface to be measured and superimposed on a reticular pattern having lines out of parallelism with the target lines to form moire fringes, and mires in the same target pattern are reflected from the curved surface and superimposed on a scale by which the distances between the reflections of the mires can be accurately measured.

Optical instruments of the type of the present invention have been known, for example, as disclosed in U.S. Pat. No. 3,544,220. Such instruments are typically used to measure the curvature of a lens such as a contact lens. Contact lenses are made to fit over the cornea of the eye with a central portion having a smaller radius than the annular portion around the periphery of the contact lens. The central portion thus may have a base curve of a given radius and the annular portion around the lens having a larger radius of curvature which is referred to as a secondary curve. For the fitting of some contact lenses there may be more than one such annular portion around the lens having curves of increasingly larger radii as they fall nearer the periphery of the lens. In certain of the most modern contact lenses, the radii of the central base curve and the adjacent secondary curve and the tertiary curve are coincident, and so on, to generate a smooth compound curve in the cross section of the lens. In this case, the center of curvature of the base curve is on the optic axis of the lens, but the center of curvature of the secondary curve is off that axis, and the center of curvature of the tertiary curve is farther off that axis, and so on. Similarly, in the human eyeball there are varying radii of curvature on the front portion of the eyeball to which the contact lens must be fitted. The center for the base curve is on the geometric axis of the cornea or the contact lens, but the center for the secondary and tertiary curves may be significantly spaced from that axis.

Accordingly, it is desirable to be able to accurately measure the curvature of a contact lens, for example, at any point along the lens and also to ascertain the point where the curvature of one lens portion is blended to, or compounded with, the greater or lesser curvature of another lens portion.

Further, the use of moire fringes for the measurement of curvatures in general is known, such as disclosed in U.S. Pat. Nos. 3,162,711 and 3,166,624. Keratometers and photokeratascopes are also used for measuring lens and eye curvatures. The optical instrument of the present invention obviates a number of problems that have been encountered in prior art with respect to moire fringe devices and keratometers in general, and in particular with respect to those devices used for the measurement of the curvature of lenses such as contact lenses.

Such lens measuring devices or keratometers are difficult to focus properly and accordingly, the accuracy of such instruments may not be optimum. Further, it is desirable that the instrument be capable of measuring both convex and concave lenses and to measure compound curvatures and to ascertain the juncture points with respect to the center of the lens on such surfaces. Still other problems have arisen in the construction of such prior art instruments such as the problems of non-linearity of zoom lens devices such as disclosed in U.S. Pat. No. 3,544,220 and with respect to the efficient and uniform lighting of the target reticle pattern.

Accordingly, it is an object of the present invention to provide apparatus for measuring the curvature of a surface.

Another object of the invention is to provide apparatus of the above character which can be quickly and accurately focused.

A further object of the invention is to provide apparatus of the above character to measure the radius of curvature at more than one point on a curved surface.

Another object of the invention is to provide apparatus of the above character for measuring box convex and concave lenses.

Still another object of the invention is to provide apparatus of the above character for measuring curves having different radii and to ascertain their point of juncture or point of compound curvature or point of reverse curvature with respect to the center of the lens.

A still further object of the invention is to provide methods and apparatus of the above character which are accurate and efficient in operation relatively inexpensive to manufacture.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 3 is a partial sectional view taken along lines 3—3 of FIG. 2;

FIG. 4 is a partial sectional view taken along lines 4—4 of FIG. 2;

FIG. 8a is a diagrammatic view of the moire fringe pattern as seen through the instrument when it is out of focus;

FIG. 8a is a diagrammatic view of the moire fringe pattern as seen through the instrument when the instrument is out of focus in a direction opposite that of FIG. 8a;

FIG. 8c is a diagrammatic view of the moire fringe pattern as seen through the instrument when the instrument is properly focused on the curved reflecting surface to be measured.

FIG. 8d is a diagrammatic view of the moire fringe pattern as seen through the instrument for the measurement of the radius of a normal simple spherical surface;

FIG. 8e is a diagrammatic view of the moire fringe pattern as seen through the instrument for measuring the base curve on a surface having both a base curve and a secondary curve both of which are centered on the same axis;

FIG. 8f is a diagrammatic view of the moire fringe pattern as seen through the instrument for measuring the secondary curve on a surface having both a base curve and a secondary curve, both of which are spherical, and have their center on the same axis;

FIG. 8g is a diagrammatic view of the moire fringe pattern formed by an aspherical lens having a spherical base curve extending to a point about 2 mm from the center, and a secondary curve, the radial center for which is not on the same axis as the radial center for the base curve;

Figure 14A:
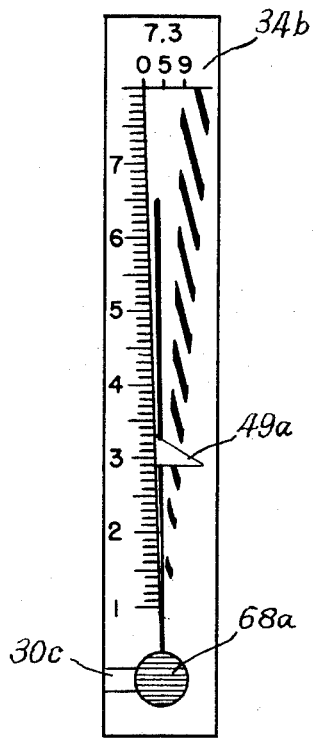

FIGS. 14a, b and c are representative moire fringe patterns and reflections of the target mires as seen through the eyepiece for the second embodiment of the invention.

Similar reference characters refer to the same parts throughout the various views of the drawings.

SUMMARY OF THE INVENTION

The moire fringe elements of the instrument are used for focusing and for the measurement of spherical surfaces. The curvature of aspherical curved surfaces is measured by target mires which are projected from the target pattern as a center light and points of light along the edge of the target pattern.

The human eye generally has a spherical apex with a diameter of about 2 to 4 mm and with a compound, flattened curved area around the apex area. The instrument of the present invention measures the spherical apex, the point of change of the radius of curvature and the curvature of aspherical portions of the eye or contact lenses.

Figure 1:
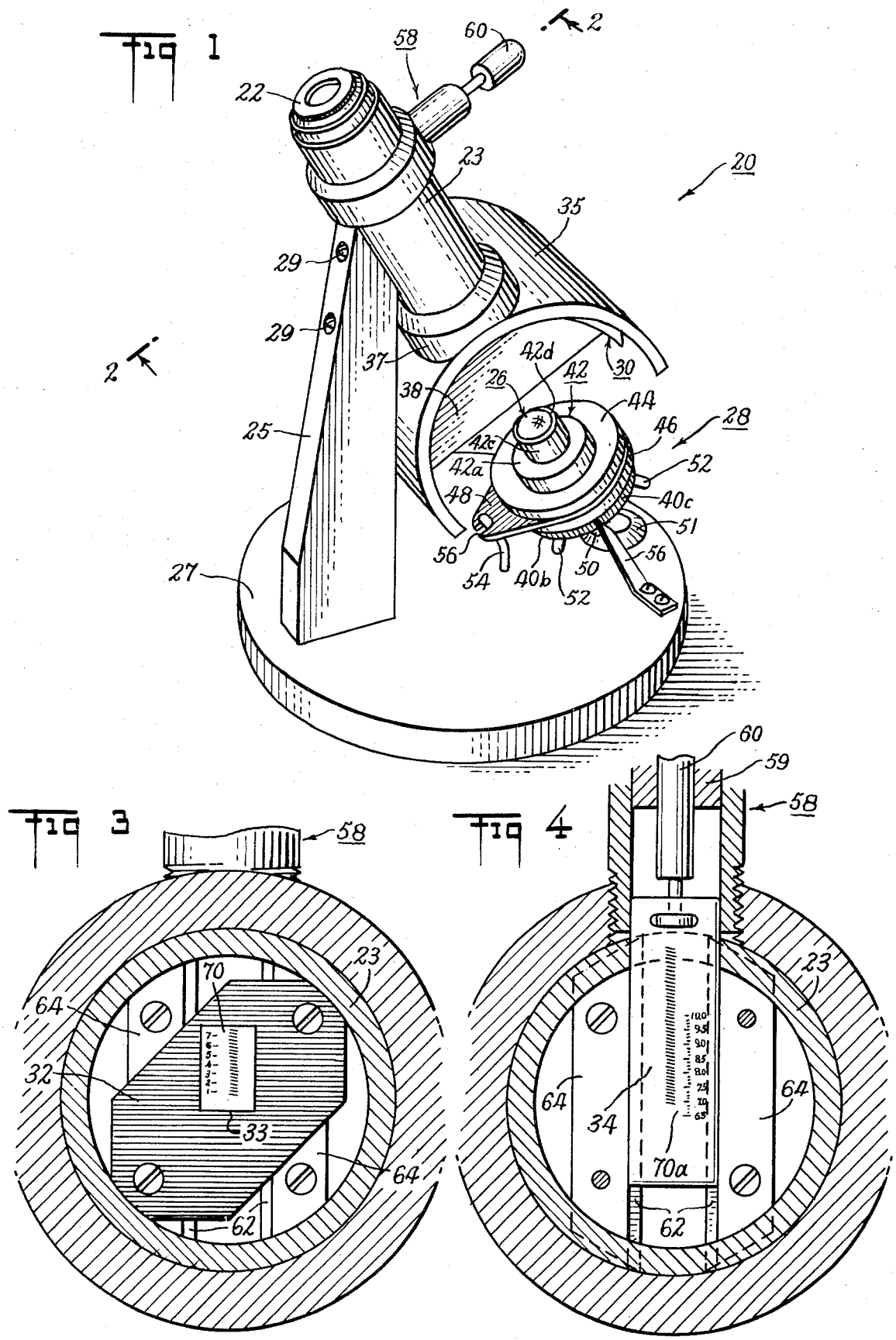
FIG. 1 is a perspective view of the optical instrument of the invention.
Figure 2:
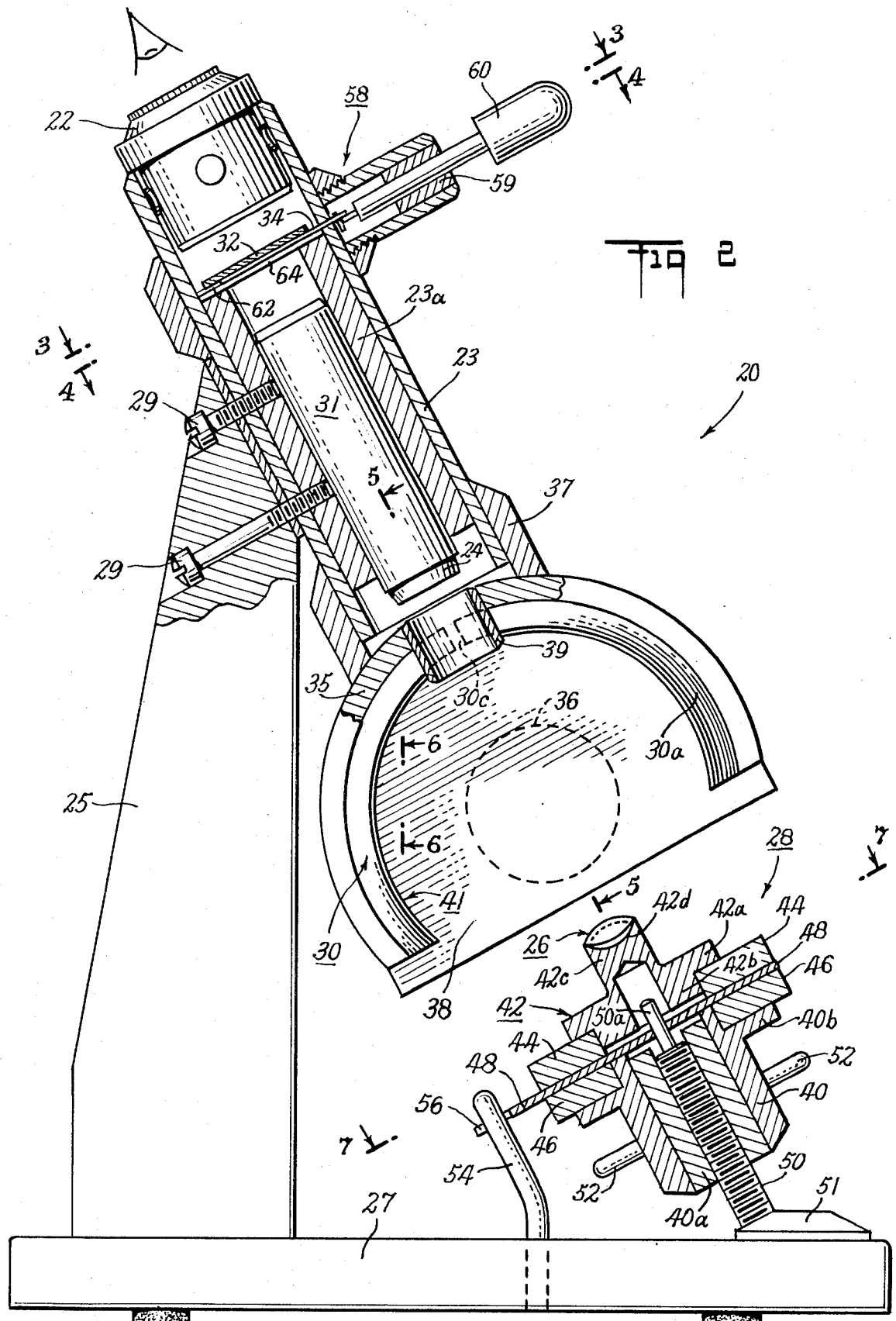
FIG. 2 is a side view in section taken along lines 2—2 of FIG. 1.

As best seen in FIGS. 1 and 2, the optical instrument of the invention comprises a monocular microscope 20 having an eyepiece 22 and an objective lens 24 which can be focused on a contact lens 26 positioned in holder 28. A light transmitting plastic arch 30 projects the reticular target pattern and the mire onto the surface of contact lens 26 for reflection back to the eyepiece of the instrument through the fixed reticle 32 and movable reticle 34 (FIGS. 3, 4) to produce moire fringe patterns and images of the mires when viewed at the eyepiece 22 such as those shown in FIGS. 8d, e and f. A single light source 36 (FIG. 5) is employed to transmit light from the center of plastic arch 30 on the other side of light baffle 38 to illuminate the reticular target pattern and mires.

Figure 12:
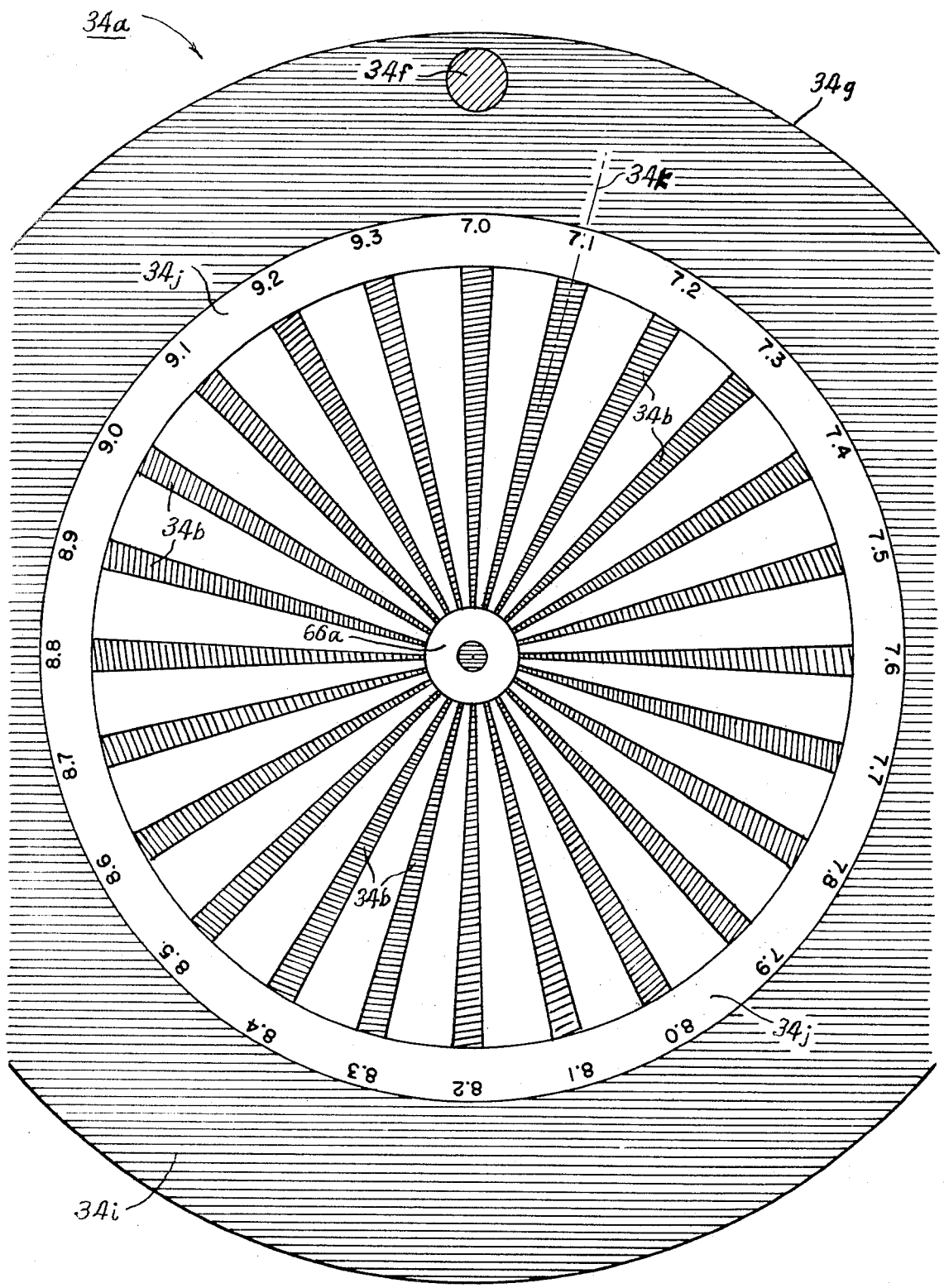
FIG. 12 is an enlarged plan view of the rotatable reticle member of the second embodiment of the invention.

The reticular target pattern and the reticular line patterns of reticles 32 and 34 may be composed of parallel lines and spaces of geometrically progressing widths in accordance with the formula $s_n = c$ times $s_{n-1}$ where:

$s_n$ = the width of any stripe, i.e. line or space
$c$ = a constant
$s_{n-1}$ = the width of the preceding stripe The lines of reticle members 32, 34 are angled with respect to the projected target image lines to produce the moire fringe pattern. Alternatively, the upper reticle may be rotatable and have a number of slanted, equally spaced lines radiating from the reticle center as shown in FIG. 12. Each radial row of lines has spacing which increases from the preceding row. The increased spacing of the lines of each row represents an increase in radius of .1 millimeter on the lens object to be measured. Thus the upper reticle is rotated until the moire fringe is vertical and the proper radius will be read from the radial line on the reticle member 34a.

The reticle members 32, 34 as shown in FIGS. 3-4 (and 32a, 34a in FIGS. 10-13) are closely spaced, e.g., .005 inch from one another with their reticular lines in side-by-side orientation when viewed through the eyepiece. This provides an effective means of focusing the instrument on the curved surface to be measured when the moire fringes as seen through the eyepiece are of equal intensity and clarity as shown in FIG. 8c. The instrument is focused by movement of the curved surface to be measured toward or away from the objective lens.

The reticular target pattern on arch 30 is divided into two quadrants with the progressively increasing width of the lines running in opposite directions for the upper reticle configuration of FIG. 4. This in combination with the half window 33 of fixed reticle 32 makes possible the separate calibration for convex or concave lenses with a single readout on the movable reticle 34. For the embodiment of the invention with a rotatable reticle as shown in FIGS. 10-13, the lines of the target pattern on arch 30 are equally spaced over each of the two quadrants. In order to get a common readout on the same reticle for both concave and convex lenses, it may be necessary to have one frequency of lines and spaces in one of the quadrants, and a slightly different frequency in the other quadrant.

DETAILED DESCRIPTION OF THE INVENTION

As best seen in FIGS. 1 and 2, the monocular microscope 20 comprises a barrel member 23 with an objective lens 24 toward one end thereof and an eyepiece at the other end of the barrel. The upright member 25 and the base 27 are preferably made of an aluminum alloy. The barrel member may be held to the upright by a pair of screws 29 and the base is secured similarly to the upright by screws (not shown).

The objective lens is held within the barrel at the lower end of the objective lens tube 31 which is fitted into a frame tube 23a within the barrel. The lens system of the low power microscope preferably provides magnification of about 10 power.

Figure 5:
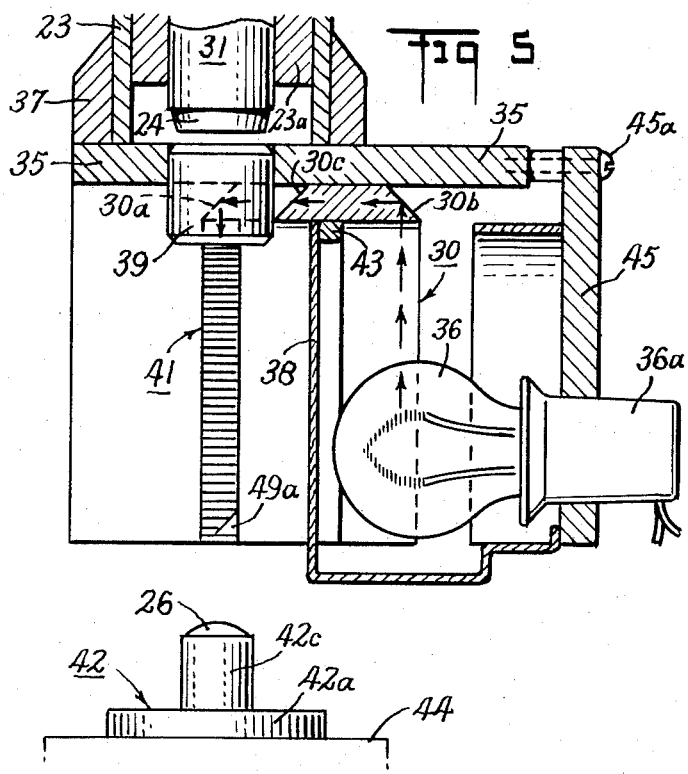
FIG. 5 is a partial sectional view taken along lines 5—5 of FIG. 2.
Figure 5A:
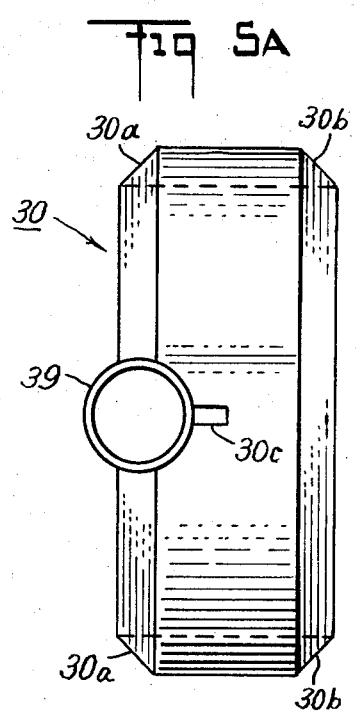
FIG. 5a is a top view of the lighting arch.

Mounted to the lower end of the barrel 23 is the target frame 35 which is secured to the barrel by target tube 37 which is connected to the target frame and is preferably removably secured to the barrel by set screws. Inside the target frame is the shield tube 39 for transmitting the target image from the lens (or the eye) through the objective lens for measurement. As best seen in FIG. 5, the plastic arch 30 is provided with the reticular target and mire pattern 41 running from the shield tube around the inside of the plastic arch in both directions for an angular distance of about 90° in each way to form two reticular target and mire pattern quadrants. The entire target pattern is preferably made by photographic means on a film which is cemented to the inside of the plastic arch. A single light source 36 is employed which is located at the radial center of the plastic arch 30 and transmits light by reflection from the upper beveled edges 30a and 30b of the plastic arch to back light the reticular target and mire pattern 41. A target baffle plate 38 is interposed between the light source and the target pattern area, the baffle plate being cemented to baffle mounting ring 43 which is cemented to the inside surface of the plastic arch. The light source may be a standard 115 volt bulb of about 25 watts which is secured in the socket 36a held in end plate 45 which is secured to the target frame by screws 45a. Thus the single light source transmits light through the plastic arch 30 which is made of a clear, light transmitting plastic such as an acrylic with bevels at both ends, 30b and 30a that are highly polished and hence reflective. The bevels are preferably at 45° but may be varied for some applications. Since the light source is at the center of the arch, the light is evenly distributed over the reticular target and mire pattern from behind the target pattern by reflection from the polished bevels 30b and 30a at the ends of the arch providing even distribution of the light to all of the target pattern. A bevelled and polished reflective notch 30c (FIGS. 2, 5, 5a) in the plastic arch provides a lighted reference point at the precise center of the plastic arch and is used to center the measured lens along the optical axis of the instrument. The lighted reference point, 30c, together with the reflected objective lens 68, are centered at the base of reticle patterns as shown in FIGS. 8a-g and as 30c and 68a in FIGS. 14a, b and c.

Figure 6:
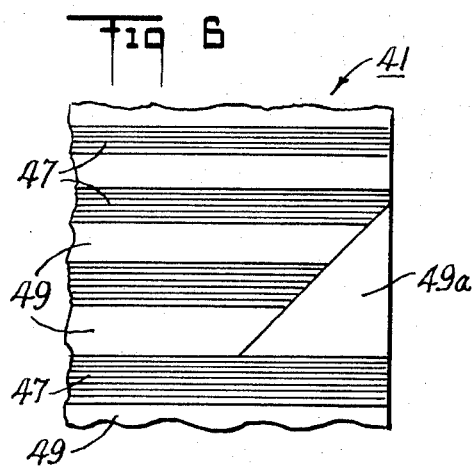
FIG. 6 is an enlarged view of the reticular target and mire pattern taken between lines 6—6 of FIG. 2.

The target pattern for one embodiment of the invention comprises a series of parallel lines and spaces of geometrically progressing widths in accordance with the formula $s_n = c$ times $s_{n-1}$ where:

$s_n$ = the width of any stripe, i.e., line of space $c$ = a constant $s_{n-1}$ = the width of the preceding stripe As shown in FIG. 6, each line 47 and space 49 is progressively wider from top to bottom. The progressively increasing line and space widths extend from the shield tube 39 in opposite configuration, i.e., in both quadrants of the arch, the lines and spaces are progressively wider at greater circumferential distances from the shield tube. This permits the measurement of both convex and concave lens surfaces using the same arch in the first embodiment of the invention. In a second embodiment of the invention the lines and spaces are equally spaced over each quadrant of the target pattern as will be more fully explained hereinafter. In both embodiments of the invention, one or more clear areas, or mires 49 are provided in each quadrant of the target pattern. One such mire is at the bottom end of the pattern; one or more additional mires may be spaced in the lower half of each quadrant.

Figure 7:
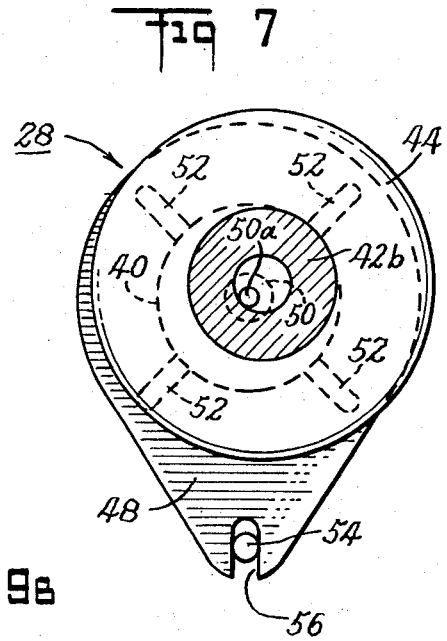
FIG. 7 is a top sectional view taken along lines 7—7 of FIG. 2.

The lens to be measured is held in an assembly comprising the threaded pedestal post 50 which is accurately aligned with the optical axis of the lens system and is secured to the instrument base 27 through pedestal mounting 51. On the threaded pedestal post is a pedestal nut 40 having several protruding pins 52 for rotating the nut and moving the assembly toward or away from the objective lens 24 of the instrument for focusing. Mounted on the pedestal nut are two ring magnets 44, 46 separated from one another by a fixed washer 48 made of a polymeric material such as polytetrafluorethylene (Teflon) or of aluminum sheet which is held on fixed pin 54 by a slot 56 as best seen in FIGS. 2 and 7. The pedestal nut has a core 40a made of Teflon or like material which is threaded to engage the pedestal post. The pedestal post has a central pin extension 50a passing through the washer 48 as a central support against lateral movement of the washer.

The lens holder 42 is preferably a unitary circular member when viewed from the top having a flange 42a which engages the top of ring magnet 44 and a closely fitting circular end portion 42b which fits into the interior of the ring magnet 44. The upper portion of the lens holder, which is preferably made of Delrin or a like material, has a raised central portion 42c having a shallow concave well 42d in the top for centrally positioning the convex side of a contact lens along the optical axis of the lens system for measuring the concave side of the lens. When measuring the convex side, another holder is used, having a convex crown in place of the concave well. For various sizes of lenses or for measuring curved surfaces other than contact lenses, a variety of holders may be used having varying diameters or configurations for holding a lens, along the optical axis of the instrument, since the holder 42 is readily removable from the ring magent 44. Flange 40b of the pedestal nut may be provided with calibrations 40c around its exterior and with a pointer 56 fixed to the base, so that the axial movement of holder 42 may be measured. For measurement of the eye, the instrument is preferably moved toward or away from the eye.

The measuring and focusing reticles of the first embodiment of the invention are best seen in FIGS. 3 and 4. There is provided a fixed reticle member 32 having a window 33 with a reticular pattern as shown in FIG. 3 lying just above the movable reticular pattern of member 34 in FIG. 4. As shown in FIG. 2, the reticle members are closely spaced about .003 to .005 inch apart with the lower reticle 34 being movable across the fixed pattern by means of a slide assembly 58 which is threadedly engaged into a sleeve fitted over the barrel 23 of the instrument just below the eyepiece. A bushing 59 frictionally holds the operating rod 60 to slide the reticle on a pair of transverse grooves 62 formed in the edges of the two guides 64. Thus the lower reticle member 34 moves with respect to the upper reticle member 32 in a direction along the longitudinal axis of the line patterns. Both of the patterns are of the same configuration as that of the target pattern being reflected from the contact lens to be measured, but the reticle patterns are proportionately smaller to closely approximate the average target pattern size which is reflected from the contact lens (or eye) being measured. The reticle member 32 has the window 33 positioned so that the line patterns of each reticle member 32, 34 appear in side-by-side configuration when viewed through the eyepiece.

As shown in FIGS. 8a, 8b and 8c, the instrument is focused by balancing of the density and clarity of the moire fringe created by the target pattern on each of the side-by-side reticular patterns of the upper and lower reticle. The reticular line patterns as described above are preferably on the bottom of the reticle member 32 and on the top of reticle member 34 to provide the side-by-side relationship as shown in FIGS. 8a, 8b and 8c. The close spacing of the reticle members makes it possible to accurately focus the target image on both reticles simultaneously as the target image is reflected by the contact lens. If the discernible depth of focus of the objective lens is about .005 inch or less this can be done to produce the moire fringes as shown in FIG. 8c having a balanced density when the instrument is in focus. If the focus is only very slightly off, one or the other of the reticles will produce only a faint moire fringe with the target image as is shown in FIGS. 8a and 8b. To bring the instrument in focus the lens to be measured is moved toward or away from the objective lens by rotation of the pedestal nut unitl the instrument is in focus and the moire fringes are of equal density and sharpness, as shown in FIG. 8c. It will be understood, of course, that the spacing of the reticles will be dependent upon the depth of focus of the objective lens.

Figure 9A:
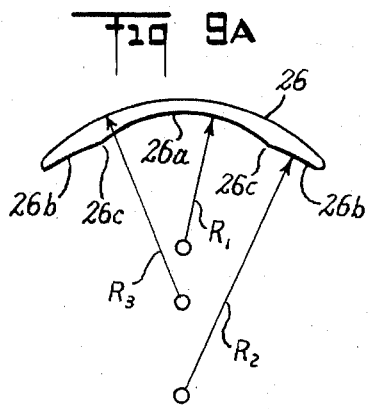
FIG. 9a is an enlarged side view in section of a conventional contact lens with all curves spherical and centered on its optical axis.

As shown in FIG. 9a, a typical contact lens 26 has an inside central portion 26a having a prescribed radius of spherical curvature while the inside annular portion 26b has a larger radius of spherical curvature. The area at 26c between the two radii is the transition area.

Figure 9B:
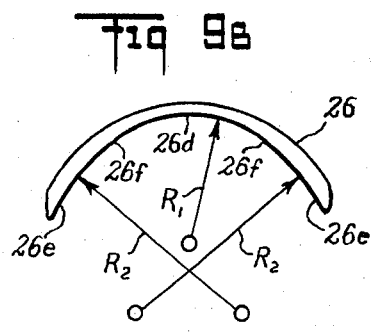
FIG. 9b is an enlarged side view in section of a contact lens employing compound curves.

As shown in FIG. 9b another form of contact lens has an inside central portion 26d having a prescribed radius of spherical curvature, while the inside annular portion 26e has a larger radius of aspherical curvature. In cross-section the two curves join at a point of compound curvature, 26f, where their tangents are coincident.

For those lens having secondary curves the transition area is "blended" to smooth out the change from one spherical curve to another with a different radius on the same axis. As shown in FIG. 9a center curve 26a has a radius $R_1$ while the secondary or outer curve 26b has a radius $R_2$ and the outer spherical curved surface of the lens has a radius $R_3$, all radii being positioned on the optical axis of the lens. Lenses having aspherical surfaces made up of compound curves do not require "blending" since the curves are tangent at the point of the change of radius. As shown in FIG. 9b the inner curve 26d has a radius $R_1$ and the outer curve 26e has a larger radius $R_2$ with a tangent point for both radii at 26f. The center for radius $R_2$ is necessarily off the axis of the lens.

The instrument will measure the radius of curvature of spherical portions by moire fringe patterns and of aspherical portions around a central portion of predetermined radius and width by keratometry and will indicate the location of transition areas and of the change of radius where compound curves are involved.

As shown in FIGS. 8a through g, the left hand scale 70 is on the fixed reticle member 32 and the right hand scale 70a is a movable reticle member 34. The lens radii are read on scale 70a from the centering line 68b. Transition distances are read from scale 70 as a break or bend in the moire fringe pattern. The size of the contact lens is read on scale 70 in terms of the mm from center to edge of the lens. In all of the FIGS., 8a through g, the edge of the lens is 5.0 mm from the center. In addition, the locations of the triangular points of light, which are reflections of the target mires, are read from scale 70. In FIG. 8d the moire fringe pattern shows that the radius of curvature of the lens is 7.5 mm. In FIG. 8e the moire fringe pattern shows that the lens has a spherical base curve with a radius of 8.00 mm and the transition area is displayed as a break in the moire fringe pattern at 3.3 mm from the lens center, as shown. In FIG. 8f the moire fringe pattern shows that the lens has a spherical secondary curve with a radius of 8.50 mm; that the secondary curve starts 3.3 mm from the center of the lens, and extends to the rim of the lens which is 5.00 mm from the center. In FIG. 8g the moire fringe pattern shows that the lens is aspherical. It has a spherical base curve radius of 8.00 mm, and the moire fringe bends gently, rather than breaking sharply (as in 8e), it is apparent that the lens has a compound curvature. Only the radius of the base curve (central portion) can be read on scale 70a. However, the radius of the annular portion can be determined by reading the position of the point of light, which is the reflection of a target mire on scale 70 – 4.30 mm from the center of the lens as shown in FIG. 8g. By reference to a conversion table, or graph, it may thus be determined that the annular portion of the lens has a radius of, say 10.00 mm. Such tables can be calculated by use of the laws of optics, as used in all keratometers, but they can also be prepared by measuring and tabulating results with assorted lenses of known dimensions. A typical chart for conversion of readings for the eye (or contact lens) would be tabulated for a given spherical center section diameter. For most purposes such a chart would be for a center portion having a radius of about 2 mm. Other charts could be made for 1.5 and 2.5 mm of radius of the central section.

As an alternate embodiment of the reticle assemblies of FIGS. 3 and 4 there is shown in FIGS. 10–13 a rotatable eyepiece having a rotary reticle member 34a which is rotatable by movement of the eyepiece 22 to bring any one of a number of calibrated striped reticular patterns 34b (FIG. 12) into view over the lower fixed reticle member 32a to form the side-by-side moire patterns when the target image is projected through these reticle members. In this embodiment of the invention the reticular lines and spaces are of equal distance apart for each line or spoke of the rotary upper reticle, but each spoke 34b has a different spacing of stripes and spaces to represent a different radius of curvature for the measured lens from which the target pattern image is being reflected.

Figure 10:
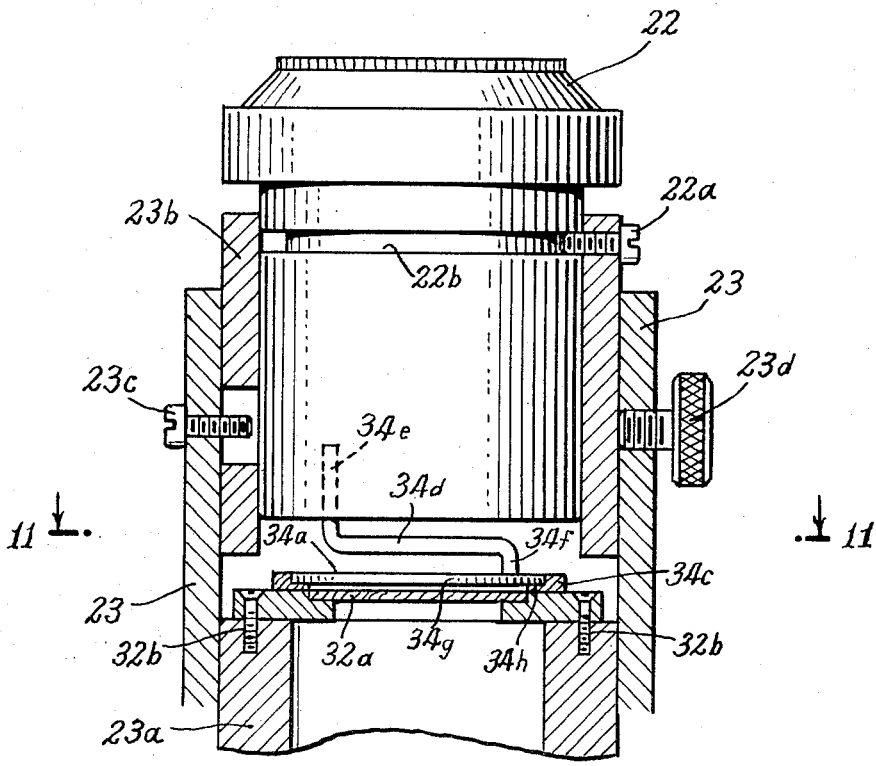
FIG. 10 is a partial side sectional view of the eyepiece end of a second embodiment of the invention.
Figure 11:
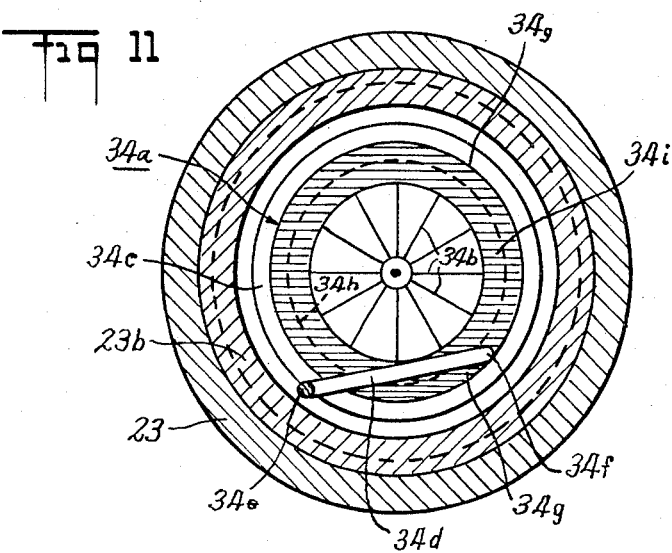
FIG. 11 is a sectional view taken along lines 11—11 of FIG. 10 in the direction of the arrows.

As shown in FIGS. 10 and 11, the eyepiece 22 is rotatable within the sleeve 23b and is restrained against vertical movement with respect to member 23b by dog-point screw 22a engaging circumferential slot 22b in the eyepiece housing. The sleeve 23b is held in the instrument barrel 23 by a restraining screw 23c and locked into position by a thumb screw 23d within the instrument barrel. The lower reticle 32a is fixed to the frame tube by screws 32b and the upper rotatable reticle 34a is positioned by peripheral retainer 34c permitting rotatable movement by a spring link wire 34d having an end 34e journaled in the eyepiece housing and an end 34f in the reticle frame 34g. Retainer 34c has a shoulder portion 34h which spaces the reticles .005 inch from each other.

As shown in FIG. 12, the upper rotatable reticle 34a has a number of line and space patterns 34d arranged in a spoke-like configuration with the lines and spaces being positioned at a slope of about 80° to the radial line 34k of the circular reticle member. The lines and spaces are a uniform distance apart for each spoke, but the width of the lines and spaces is greater for each spoke in the counterclockwise direction from the spoke marked 7.0 around to the last spoke marked 9.3. For example, if spoke marked 7.0 contains 1,000 lines per inch, then the next spoke marked 7.1 would contain 1,000 times 7.05 over 7.15 lines per inch. For the spoke marked 7.2 the number of lines per inch would be 1,000 times 7.05 over 7.25 and so on for each successive reticular spoke with the denominator being determined by the addition of .05 to the spoke designation. As shown in FIG. 12, the exterior band 34i of the reticle member 34a is black or opaque. The band 34j containing the radius figures (in millimeters) is clear, and the areas between the reticular pattern spokes is also clear.

Figure 13:
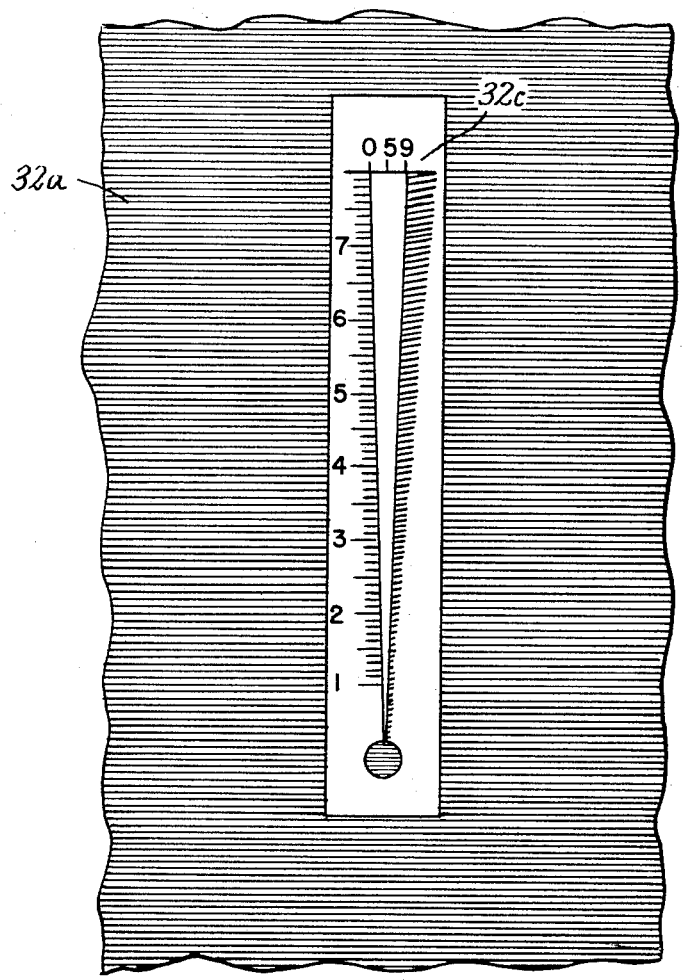
FIG. 13 is an enlarged plan view of the fixed reticle member of the second embodiment of the invention.

As shown in FIG. 13, the fixed reticle member 32a for this embodiment is provided with a pattern having a focusing pattern 32c on one side of the small arcuate portion shown and a measuring pattern numbered 1 to 7 on the left side. The entire reticle is black or opaque for its entire diameter except for that shown in the clear window with the reticular pattern thereon. As shown in FIG. 12 the upper reticular pattern has a clear area 66a at its center for aligning the center of the lens to be measured with the center of the target image, by means of the center light 30c, as shown in FIGS. 14 and 8.

In operation, as shown in FIG. 14, the operator will first focus the instrument in exactly the same manner as in the first embodiment by balancing the split moire fringe pattern so that both sides of the pattern are of equal clarity and density. This can be accomplished by the use of a predetermined focusing spoke on the rotatable reticle. For example, the spoke marked 8.0 (FIG. 12) may have 875 lines per inch and the fixed reticle may also have 875 lines per inch. The focusing spoke will be at a predetermined line spacing for the reflected target images. The focusing image thus will show two moire fringe patterns (one with the fixed reticle and one with the rotatable reticle) in side-by-side relation. When both of these patterns are of equal density and clarity the instrument is in focus.

Figure 14B:
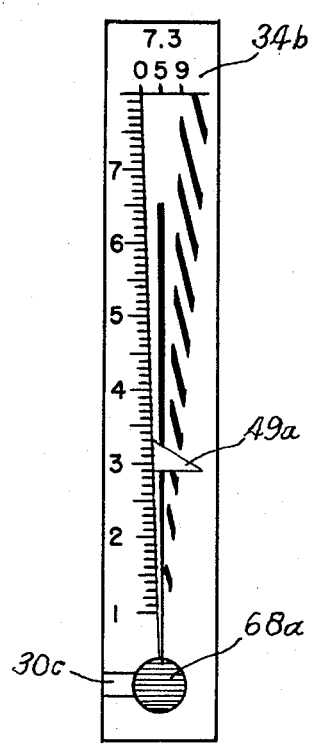
Figure 14C:
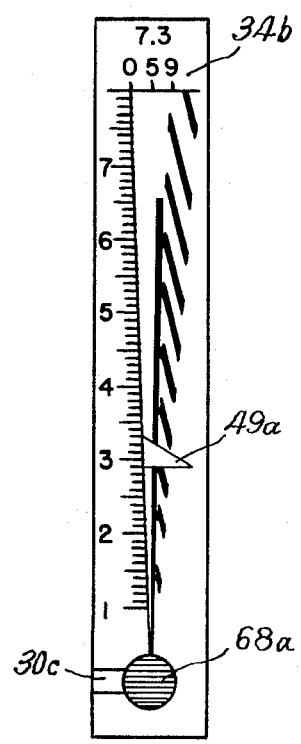

After the instrument is focused the operator will then find the correct one of the reticular spokes by rotating the eyepiece until the moire fringe pattern forms a substantially vertical line as shown in FIGS. 14a and 14b or 14c. If the radius of the contact lens being measured is a little bit less than 7.35 the fringe line will be slightly to the left of the center line as shown in FIG. 14a. If the contact lens has a radius of slightly more than 7.35, it will be a bit to the right of the center line of the spoke as shown in FIG. 14c. For a measurement of 7.35 millimeters the fringe line will be that shown in 14b. The spacing of the lines on the reticle is fixed and accordingly, as the size of the image of the target increases, the moire fringe line will move in a clockwise direction. The number such as 7.3 and the 0, 5, 9 vernier numbers will be seen through the eyepiece as shown in FIGS. 14a, b and c.

In use, both embodiments of the invention function in essentially the same manner. After the lens is inserted in the holder and is centered under the objective lens by reflected light the instrument is focused by movement of the lens to be measured toward or away from the objective lens. The movable reticle member is then moved to a position whereby the appropriate moire fringe pattern is seen through the eyepiece. Lens radius and transition locations are than read directly from the scales as shown in FIGS. 8a–g and 14a–c.

As in the first embodiment of the invention, the target mires are also used to ascertain the radius of aspherical surfaces or aspherical portions of the curved surfaces to be measured.

The moire fringe line may also be used for the production testing of curved surfaces to determine whether or not the curved surface is spherical and/or whether the radius of curvature is within tolerance. Such an application may be used, for example, for the checking of ball bearings. If the fringe line is not straight the ball is aspherical. If the fringe line is not within certain lateral limits, the ball would be too large or too small. Photoelectric sensors may be used to monitor the fringe line in a production testing machine. In such an application a movable reticle may not be required, but the reticle should be masked as in the above embodiments to provide only a portion of a moire fringe pattern and preferably only one line thereof.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

What is claimed is:

1. An optical instrument for measuring the curvature of surfaces comprising
    A. an eyepiece lens;
    B. an objective lens positioned substantially on the same optical axis as said eyepiece lens;
    C. holder means for positioning a curved surface to be measured in alignment with the optical axis of said lenses;
    D. means for projecting a target pattern from the surface to be measured;
    E. a first reticle member between said eyepiece lens and said objective lens,
        1. said first reticle member having a pattern forming a moire fringe pattern when said target pattern is superimposed thereon;
    F. a second calibrated reticle member closely spaced to said first reticle member,
        1. said second reticle member having a pattern forming a moire fringe pattern when said target pattern is superimposed thereon,
        2. said second reticle member being marked adjacent said moire fringe forming pattern for ascertaining curvature characteristics of the surface to be measured, said markings being visible through said eyepiece,
        3. said second reticle member pattern being positioned adjacent said first reticle member pattern for side-by-side comparison of the density and sharpness of the moire fringe formed by each reticle pattern and said target pattern for precisely indicating the focusing of the instrument on said surface to be measured;
    G. means for moving said second calibrated reticle member to vary the pattern with respect to the target pattern superimposed thereon, and
    H. focusing means for varying the optical relationship between said eyepiece lens, said objective lens and said curved surface to be measured.

2. The instrument defined in claim 1 wherein said target pattern is provided with a centering reference point mire and at least one other mire spaced from said centering reference point mire, said calibrated reticle member being calibrated from said centering reference point mire, whereby the radius of a secondarily curved surface may be measured around a central substantially spherical surface of predetermined radius and width.

3. The instrument defined in claim 1 wherein said means for moving said calibrated reticle member comprises a guideway and a slide holding said calibrated reticle, said guideway permitting movement of said calibrated reticle toward and away from the optical axis of said instrument and in a plane substantially normal to said axis.

4. The instrument defined in claim 1 wherein the means for moving one of said reticle members comprises a rotatable mounting having a plurality of calibrated moire fringe forming patterns thereon, each said pattern representing a different radius of curvature of a surface to be measured.

5. The instrument defined in claim 1 wherein there are provided two of said target patterns positioned along a circular arc with a radial center on the optical axis of the instrument and the optical axis of the central portion of the surface to be measured, with each of said target patterns extending in opposite directions from the optical axis of the instrument, whereby convex and concave curved surfaces may be measured by reflection of at least one of said target patterns from the curved surface.

6. The instrument defined in claim 1 wherein the lines and spaces of said target pattern vary in width progressively from the target center to the ends of the target and wherein the patterns of said first and second reticles for forming moire fringe patterns with said target pattern are composed of lines and spaces of the same progression of varying widths over the length of the reticle patterns.

7. The instrument defined in claim 1 wherein there is provided a light transmitting arch upon which said target pattern is mounted and a light source positioned inside said arch, said arch having reflecting bevels at its curved ends for passing light from said light source through said arch to backlight said target pattern and to project the pattern onto the curved surface to be measured.

8. The instrument in claim 1 wherein said focusing means comprises a pedestal and movable means on said pedestal for supporting said holder means and movable toward and away from the objective lens of said instrument along the optical axis thereof.

9. The instrument defined in claim 8 wherein said focusing means further comprises a first magnetic means on said movable means, a second magnet means supporting a lens holder and a separator between said magnetic means whereby said holder may be positioned with respect to the optical axis of said instrument by lateral movement of said second magnetic means and be held as positioned by magnetic force.

10. The instrument defined in claim 8 wherein said focusing means further comprises a threaded pedestal having a longitudinal axis fixed along the optical axis and said movable means comprises a threaded nut on said pedestal and calibrated means for indicating axial movement of said nut along said pedestal.

11. An optical instrument having an eyepiece lens and an objective lens for measuring the curvature of spherical surfaces by moire fringe patterns, comprising
   A. means for reflecting a pattern of spaced target lines from a surface to be measured;
   B. means for superimposing a reticular line pattern over the target pattern lines;
   C. said target lines and said reticular lines each being comprised of substantially parallel stripes having spaces therebetween, said stripes and spaces having widths determined by the formula
   $Sn = C$ times $Sn-1$ where
   $Sn =$ the width of any stripe or space,
   $C = a$ constant
   $Sn-1 =$ the width of the preceding stripe or space,
   1. one of said target lines and said reticular lines being slanted out of parallelism with the other when superimposed; and
   D. calibrated means for varying the position of said superimposed reticular pattern on said target pattern in a plane substantially normal to the common axis of said objective and eyepiece lens,
   1. said calibrated means comprising markings adjacent said superimposed pattern, said markings being visible through the eyepiece lens; and
   E. means for focusing the instrument by varying the optical relationship between said eyepiece lens, said objective lens and said curved surface to be measured,
whereby the curvature of a spherical surface may be measured and the location of transition areas may be determined by formation of a recognized moire fringe pattern formed by said reflected target lines and said reticular pattern.

12. The instrument defined in claim 11 wherein said pattern of spaced target lines includes a centering mire and at least one additional mire on said pattern and spaced from said centering mire for determining the radius of secondarily curved surfaces located around a central substantially spherical surface of predetermined radius and width.

13. The instrument defined in claim 11 wherein said means for reflecting a pattern of spaced target lines comprises an arch of light transmitting material having bevelled reflecting portions around the target lines, a light source inside said arch and spaced from said target lines, a second bevelled reflecting portion around said light source and light baffle means between said light source and said target lines.

14. The instrument defined in claim 11 wherein said means for focusing comprises a pair of reticular line patterns closely spaced between the eyepiece and objective lens of the instrument and having their reticular line patterns arranged so that said patterns appear in side-by-side relationship when viewed through the instrument, whereby the instrument is in focus when the moire fringe patterns formed by said target lines and each of said reticular line patterns appear to be of equal density and clarity when the optical relationship between said eyepiece and objective lenses and said curved surface to be measured are adjusted by said focusing means.

15. The instrument defined in claim 11 wherein said means for imposing a reticular line pattern over the target pattern lines comprises a member holding said reticular line pattern, said member being movable in a direction substantially normal to the common axis of said eyepiece and objective lenses.

16. In an optical instrument for measuring curved surfaces and having an eyepiece, an objective lens and means for focusing on the surface to be measured,
   A. means for reflecting a target pattern from the curved surface to be measured and through the objective lens;
   B. a reticular pattern positioned between the objective lens and the eyepiece to form moire fringe pattern with said target pattern,
      1. said reticular pattern being movable in a plane substantially normal to the axis of the objective lens and eyepiece to change the reticular pattern upon which the target pattern is imposed, and
      2. calibrated indicia on said reticular pattern for indicating measurements when recognizible moire fringe patterns are seen through the eyepiece.

17. The instrument defined in claim 16 wherein said recticular pattern is mounted on a rotatable member having thereon a plurality of calibrated reticular patterns for forming a moire fringe pattern when superimposed upon said reflected target pattern, said member being rotatable in a plane normal to the axis of said instrument to align one of said reticular patterns for superimposition on said target pattern.

18. In an optical instrument for measuring curved surfaces and having a lens system and means for positioning a curved surface to be measured, a back lighted target pattern arch comprising
   A. a member of light transmitting material arched around the approximate center of a curved surface to be measured,
      1. and having first and second circumferential ends;
   B. a target pattern along the inner first end of said member and
      1. a first light reflecting bevel along the outer circumference thereof;
   C. a light source spaced from and inside the second end of said member, and
      1. a second light reflecting bevel along the outer circumference of said second end for reflection of light through said arch from the second to the first end; and
   D. light baffle means between said target end and said light source
whereby the light source backlights the target pattern by reflection of light from said first and second light reflecting bevels.

19. An optical instrument for measuring curved surfaces, comprising
   A. means for reflecting a target pattern from the curved surface to be measured;
   B. means for superimposing a moire fringe forming pattern on the reflected image of said target pattern; and
   C. masking means for showing only a portion of a moire fringe pattern formed by said target pattern and said superimposed pattern,
      1. said masking areas comprising means forming a narrow viewing opening having calibrated markings across an end of said narrow opening for viewing a portion of said moire fringe pattern and the position of said pattern with respect to said calibrated markings,
whereby the lateral shifting of the moire fringe pattern indicates a variation in the radius of curvature of a measured surface.

20. In an optical instrument for measuring the curvature of surfaces which has an eyepiece lens, an objective lens and holder means for positioning the curved surface to be measured in alignment with the optical axes of said lenses, the combination comprising
   A. means for reflecting a target pattern from the surface to be measured;
   B. a first reticle member between said eyepiece lens and said objective lens,
      1. said reticle member having a reticular pattern provided a moire fringe pattern through said eyepiece lens when said target pattern is superimposed thereon;
   C. a second reticle member closely spaced to said first reticle member,
      1. said second reticle member having a reticular pattern providing a moire fringe pattern through said eyepiece lens when said target pattern is superimposed thereon,
      2. said second reticle member pattern being positioned adjacent said first reticle member pattern for comparison of the moire fringe formed by each reticle pattern when superimposed on said target pattern for precisely focusing the instrument on said curved surface to be measured when the moire fringe patterns formed by each said reticle is of the same intensity and clarity; and
   D. focusing means for varying the optical relationship between said eyepiece lens, said objective lens and the curved surface to be measured.

21. The instrument defined in claim 20 wherein at least one of said reticles is movable with respect to said target pattern upon which it is superimposed and is calibrated to provide direct lens measurement information by the position of changes in the moire fringe pattern formed by said movable reticle and said target pattern.

* * * * *

UNITED STATES PATENT OFFICE
CERTIFICATE OF CORRECTION

Patent No. 3,861,808　　　　　　　Dated　January 21, 1975

Inventor(s)　Edmund R. Halsey

It is certified that error appears in the above-identified patent and that said Letters Patent are hereby corrected as shown below:

Column 2, line 20, "box" should be --both--;
Column 2, line 62, "8a" should be --8b--;
Column 5, line 62, "49" should be --49a--;
Column 6, line 34, "magent" should be --magnet--.

Signed and sealed this 8th day of April 1975.

(SEAL)
Attest:

RUTH C. MASON
Attesting Officer

C. MARSHALL DANN
Commissioner of Patents
and Trademarks